United States Patent Office 3,376,140
Patented Apr. 2, 1968

3,376,140
PROCESS FOR REMOVING FLAVOR
PRECURSORS FROM PEANUTS
Harsch C. Ince, Jr., Wallingford, Pa., assignor to The Procter & Gamble Company, Cincinnati, Ohio, a corporation of Ohio
No Drawing. Filed Aug. 19, 1965, Ser. No. 481,085
6 Claims. (Cl. 99—126)

ABSTRACT OF THE DISCLOSURE

A process for preparing a substantially flavor-free peanut product having the texture of roasted peanuts by extracting raw peanut kernels at a temperature of from about 100° F. to about 160° F. with an amount of water sufficient to give a water to peanut weight ratio of at least 2:1, and drying the peanut kernels so extracted for from about 30 minutes to about 150 minutes at a temperature of about 200° F. to about 325° F. to a final moisture content of less than about 4% by weight.

---

The present invention relates to the treatment of peanuts and is directed more precisely to a process for removing flavor precursors from raw peanuts.

It is well known that if raw shelled peanuts are heated in an oven maintained at between about 290°–350° F., usually about 325° F., for a sufficient period of time, say, about 20–30 minutes, the peanuts become crisp and frangible, and darken in color from a creamy-white to a light golden to cocoa brown according to the severity of the time and temperature. This treatment, known in the art as roasting, is also recognized as a necessary precedent to the formation of the easily recognized and well-known flavor which is characteristic of all commercial forms of edible peanuts. Whereas raw peanuts exhibit a bland, raw protein flavor and odor, properly roasted peanuts acquire what has been described as a deep, toasted protein flavor with sulfurous undertones, and a strong aromatic odor. While the source of this flavor and odor has not been well defined, there is reason to believe that it is composed of a series of characteristic aldehydes and ketones which are formed from the reaction of certain "flavor precursors" within the peanut during roasting.

In practically all of the products in which peanuts are presently used, characteristic roasted peanut flavor is most advantageous. However, due to its extremely pronounced and dominant quality, this flavor does not blend well with other more delicate flavors. Moreover, when roasted peanuts are employed in food products which contain an appreciable amount of free water, such as ice cream, cake and cookie batters, jellies, preserves, relishes, pie fillings and so on, the roasted peanuts tend to acquire a bitter flavor which is frequently accompanied by an unpleasant, rancid-like odor. It is primarily for this reason that roasted peanuts are rarely, if ever, encountered in this class of edibles, but appear almost exclusively in foods which contain no free water.

Apart from their flavor, roasted peanuts have another valuable characteristic, namely, a brittle, crunchy texture in the mouth. Because of their distinctive bite, roasted peanuts would be a valuable additive to numerous food products which contain an appreciable amount of free water to impart zest, variety and interest in eating quality, were it not for their tendency to override and distort the other desirable flavors of the products, and to develop undesirable off-flavors.

Previously, no peanut product has been available which possessed the brittle, crunchy texture of roasted peanuts but does not possess the above noted dominant peanut flavor and the tendency to develop off-flavors in a water-containing system. More specifically, the prior art has never taught a method for treating raw, unroasted peanuts whereby a substantially flavorless peanut product is produced which possesses the brittle, crunchy texture of normal roasted peanuts.

Therefore, it is an object of this invention to provide a method of removing characteristic flavor precursors from raw peanuts.

It is another object of this invention to provide a method of preparing a substantially flavor-free peanut product which has the texture of roasted peanuts.

It is a further object of this invention to provide a crisp peanut product which is high in nutritional content, and is substantially free of the characteristic roasted peanut flavor.

Other objects and advantages of this invention will become apparent from the following description and claims.

It has now been discovered that the objects of this invention can be attained by treating raw, unroasted peanuts, in the form of either whole or half kernels or granules, in such a way as to remove at least the major portion of the flavor precursors which give roasted peanuts their normal strong, dominant flavor characteristics. The flavor precursors are removed from the raw peanuts by leaching the peanut kernels or granules in sufficient water to promote intimate contact between the kernels or granules and the water until the desired amount of the flavor precursors have been extracted, and then drying the kernels or granules until they have acquired the characteristic peanut texture. In this manner it is possible to obtain a peanut product substantially unchanged in physical form and nutritional value which is surprisingly free of any tendency toward the development of off-flavors, even when incorporated in food products which contain an appreciable amount of free water. This peanut product is peculiarly adapted to supply texture interest to food products generally having ascendant flavoring characteristics other than that of roasted peanuts, especially those of a rather delicate or subtle nature.

The choice of the type of peanuts to be treated in accordance with the present invention is not critical. No essential difference has been found, for example, between the so-called Spanish, Virginia and Runner varieties.

Before raw peanuts are exposed to the novel treatment steps herein disclosed, the peanuts are shelled and, if desired, blanched and split. Blanching is the term applied to the step of removing the skins or testa from the kernels. Since it is often difficult to remove the skins from raw peanuts by mechanical means, it is generally preferred that the skins be removed by water washing. Water washing to remove the skins can be accomplished, if desired, in the first step of the present process, the water extraction step, which will be more fully explained hereafter. Thus, this process eliminates the need for a special blanching step, although one may be used if desired. If the kernels are split for treatment in the form of halves or granules, it is normally desirable that the "heart," or "germ," be removed, for example by screening with a standard 6-mesh screen.

In essence, this invention can be considered to start with suitable shelled, and if desired, pre-blanched and/or split raw peanut kernels. It is normally preferred to take advantage of the higher extraction efficiency afforded by treating smaller peanut particles than whole or half kernels. To this end, the peanut kernels may be reduced in size by granulation. The peanuts can be passed through a hammer mill, a roller mill, or any of the various grinders, crusher, choppers, cutters and like mechanisms known in the art for subdividing peanuts and materials similar to peanuts. Granules may then be classified by size, if desired, to produce any size fraction which may be selected for treatment. If such sizing is practiced, return of any oversized particles from the first pass through the granulator is particularly recommended to increase the proportion of the usable fraction. Any conventional screening equipment functioning either on a batch or continuous basis can be used to recover the desired fraction.

Peanuts, either in the form of whole kernels, half kernels, or in the desired fraction of granulated particles, hereinafter referred to collectively as "peanut pieces," are ready for treatment in accordance with the present invention.

The first operation in the process is to place the peanut pieces in a suitable container for water extraction. The type of equipment used is not a limitation upon this invention, but it is generally most convenient to use an appropriately-sized tank or similar vessel, equipped with any of the standard means of agitation, for example, a conventional rotary impeller. Sufficient water should be used to promote intimate contact between the peanut pieces and the liquid, and to provide sufficient water to promote efficient extraction of the flavor precursors from the peanut solids. To do this, an amount of water sufficient to give a water to peanut weight ratio of at least 2:1 is used. Below this ratio, the amount of water present is insufficient to efficiently contact all of the peanut pieces and to extract the unwanted flavor precursors. There is no upper limit on the water to peanut ratio other than that determined by economics and the capacity of the equipment which is used. As a practical matter, however, an amount of water in excess of 15 to 20 times the weight of the peanut pieces being processed is excessive and adds little, if anything, to the efficiency of the extraction. The preferred water to peanut weight ratio is from about 3:1 to about 10:1.

In the preferred operation of this process, a series of separate extractions are made using fresh water during each separate extraction step. The fresh water increases the efficiency of the extraction by removing the previously extracted flavor precursors from contact with the peanut pieces. The water to peanut weight ratios delineated above are also applicable to each extraction step of this series operation, but generally ratios which are in the lower portion of the range are used, the higher weight ratios being particularly well suited to single step extraction processing. An especially preferred process is that which uses three successive extractions with water to peanut weight ratios of about six to one.

The duration of the extraction step or steps is dependent upon the amount of water which is used, the size of the peanut particles, and the extraction temperature. Longer extraction times are required when lower water to peanut ratios, larger peanut pieces and lower extraction temperatures are employed. As a rule, efficient removal of the undesirable flavor precursors cannot be achieved in less than about 15 minutes, regardless of the water to peanut ratio, the temperature, and the size of peanut pieces which are used. The upper limit of the extraction time, like the upper limit of the water to peanut ratio, is determined mainly by convenience and equipment limitations, but, for an efficient operation, need not be longer than about 120 minutes. When a series of successive extraction steps is used, as described above, the total extraction time can be somewhat shorter if desired. The preferred extraction time and the one which will give satisfactory results for most combinations of extraction conditions, is from about 25 minutes to about 75 minutes.

The extraction temperature, i.e., the temperature of the water used in the extraction of the flavor precursors, must be less than about 170° F. (79° C.), and preferably not greater than about 160° F. (71° C.). When water with a higher temperature is used, a change in the internal structure of the peanut pieces is affected which is harmful in two respects; first, the extraction of the flavor precursors is hindered and, in many cases, stopped entirely; secondly, the final peanut product will have a tough consistency and an off-flavor and color which is unappealing to the consumer. Below this upper limit, the efficiency of the extraction increases with increasing temperature. Thus, the use of higher extraction temperatures permits the use of lower water to peanut weight ratios, shorter extraction times and larger peanut pieces. Extraction temperatures below about 100° F. (38° C.) and, preferably, below about 125° F. (52° C.), should be avoided due to the lower efficiency of the extraction and the consequential increase in the length of extraction time which is required. The most highly preferred extraction temperature is from about 140° F. (60° C.) to about 150° F. (66° C.); this gives a rapid and efficient extraction while allowing a reasonable margin of safety below the above-noted upper limit for extraction temperatures.

While all of the above-mentioned extraction conditions can be varied within the above-indicated limits to suit the time, equipment and product requirements of the individual practitioner, it has been found for peanut pieces with an average dimension of about 0.15 inch, an exceptionally efficient extraction operation can be made under the following approximate conditions.

(1) Extraction temperature _____ 150° F. (66° C.)
(2) Number of extractions _____ 3
(3) Water to peanut weight ratio, each extraction __ 6:1
(4) Extraction time:
    First extraction _____minutes__ 5
    Second extraction _____do____ 20
    Third extraction _____do____ 20

As a result of the previously described extraction operation, substantially all of the flavor precursors which impart the characteristic peanut flavor to roasted peanuts are removed; however, the peanut pieces are left with a highly increased moisture content. While the extent of the increase in moisture content will vary, depending primarily on the duration of the extraction operation, the original natural moisture content of the peanuts which ranges from about 1% to about 3% by weight is increased to a level of about 20% to about 45% by weight. This moisture content must be reduced to less than about 4% by weight, preferably to from about 2% to about 3.5% by weight, in order to give the peanut pieces a texture similar to that of roasted peanuts.

Thus, the second operation in the process of this invention is drying the peanut pieces which have been extracted as described above. This drying operation serves to remove a major portion of the moisture content which the peanut pieces have acquired in the extraction step and gives the peanut pieces a brittle, crunchy texture which is characteristic of roasted peanuts. The drying also serves to remove the residual raw peanut flavor—vis-à-vis the precursors removed in the extraction step—from the peanut pieces. If a separate pre-blanching operation has not been performed, any skins remaining on the peanut pieces should be rinsed away prior to drying.

Any conventional drying apparatus capable of obtaining the drying conditions hereafter described can be used. However, the use of a forced draft oven, or other such equipment which utilizes a stream of heated, moving air, has been found to be particularly effective due to the greater efficiency in moisture removal provided by this type of equipment.

Drying can be performed over a wide range of temperatures, from about 200° F. (93° C.) to about 325° F. (163° C.). In the preferred operation, drying temperatures below about 250° F. (121° C.) are not used, because at these lower temperatures the time required to dry the peanut pieces is unduly long. In addition, higher temperatures are necessary for the desirable "browning" of the peanut pieces, and for removal of the native raw flavor of unroasted peanuts. Likewise, in the preferred operation, drying temperatures in excess of about 300° F. (149° C.) are avoided. At temperatures above this point, the peanut pieces are likely to experience excessive browning, or even burning, both of which are detrimental to the texture and flavor of the peanut pieces.

The time required to adequately dry the peanut pieces will vary with the drying temperature and, of course, the amount of water which must be removed from the peanuts. Even at the highest of the allowable drying temperatures, a minimum drying time of about 30 minutes is used to allow for adequate moisture removal. It is generally unnecessary to prolong drying for more than about 150 minutes. The preferred drying time is from about 60 minutes to about 120 minutes. For most granulated peanuts, an excellent combination of drying conditions has been found to be a temperature of about 280° F. (138° C.) and a drying time of about 90 minutes.

It has also been found that a more peanut-like texture is obtained when the air used in drying is not extremely low in moisture content. The use of air of low humidity leaves the peanut pieces with an unduly hard and tough texture. However, when air with a relative humidity of from about 10% to about 50% is used, a crunchy, peanut-like texture is obtained, avoiding the extreme hardness mentioned above. In order to take advantage of the fact that the removal of water from the peanut pieces is more rapid when air of low moisture content is used, the pieces can effectively be dried with a low moisture content air for the first part of the drying operation, followed by drying for a time with a higher moisture content air to achieve the texture benefits described above. For example, when 250° F. (121° C.) to 300° F. (149° C.) air is used in a 90-minute drying operation, the use of 10% relative humidity air for about the first 60 minutes, followed by the use of 40% relative humidity air for about 30 minutes leaves the peanut pieces with a brittleness and texture which closely approximate those of normal roasted peanuts.

Peanut pieces processed as described above are substantially identical to ordinary roasted peanut pieces in appearance and texture. However, they possess very little of the flavor characteristics of either raw or roasted peanuts. They can be eaten directly if desired, and will be found to have a pleasant bland taste which is similar in some respects to toasted protein. They may be added to any dry product in which roasted peanuts are commonly used and will retain their desirable brittle, crunchy texture. In addition, they can be used in food products which contain an appreciable amount of free water without developing unpleasant odors or flavors. In addition to these benefits, it is important to note that the wholesome nutritional content of the peanut pieces is left substantially unchanged, thus making the product a valuable foodstuff even in areas where the peculiarly desirable texture of peanuts is not required.

The following examples are given to demonstrate the use of the extraction and drying processes described above in preparing a substantially flavorless peanut product from raw peanuts. However, these examples are not intended to be limitations upon the invention.

EXAMPLE 1

Cured Virginia peanuts, commercial grade #1, were split, freed of their hearts, and granulated in a conventional hammer mill to an average particle size of about 0.15 inch. Fifteen pounds of these peanut granules were placed in an 18-inch diameter stainless steel tank which was equipped with a mechanical agitator of the conventional impeller type. The peanut pieces were then extracted with three successive 90-pound (10.9-gallon) segments of water. The extraction times were five minutes, twenty minutes, and twenty minutes, respectively. The water temperature in all cases was 150° F. (66° C.), and the agitator speed was maintained at 30 revolutions per minute. The granules were then drained, rinsed to remove the peanut skins, and placed in perforated metal trays to a depth of about one inch. The trays were then placed in a forced draft oven and the granules dried for 90 minutes with air at 280° F. (138° C.). The relative humidity of the air which was used for drying was maintained at 10% for the first sixty minutes of the drying operation, and then raised to 40% for the final thirty minutes. The trays which contained the peanut granules were manually shaken periodically to redistribute the granules and insure uniform drying of the granules. At the end of the drying operation, the peanut pieces were cooled to room temperature. When smelled and tasted, the processed peanut granules were substantially free from the characteristic odor and flavor of both raw and roasted peanuts, but had a brittle, crunchy texture which was substantially identical to that of roasted peanuts.

One ounce of the peanut granules so processed was incorporated into a 20-oz. dry chocolate cake mix having the following composition, expressed in percent by weight:

| | |
|---|---|
| Sugar | 43.4 |
| Flour | 32.4 |
| Shortening | 13.0 |
| Non-fat milk solids | 2.5 |
| Cocoa | 6.2 |
| Soda | 1.3 |
| Monocalcium phosphate | 0.2 |
| Sodium acid pyrophosphate | 0.3 |
| Salt | 0.7 |
| | 100.00 |

To the cake ingredients-peanut granules mixture were added two whole eggs and one cup of water. This mixture was then beaten for one minute at medium speed with a standard household electric mixer. The mixer was then poured into cake pans and baked at 350° F. (177° C.) for 30 minutes. The cake product was then cooled and tasted. The peanut pieces in the cake exhibited a desirable crunchy texture in the mouth, but lent no noticeable flavor of their own to the cake.

EXAMPLE 2

Cured Spanish peanuts were blanched, split and freed of their hearts. Fifteen pounds of these peanut halves were placed in an 18-inch diameter stainless steel tank which was equipped with a mechanical agitator of the conventional impeller type. The peanut halves were then extracted with 150 pounds of water for 120 minutes. The water temperature was 120° F. (49° C.) and agitation was maintained at 30 revolutions per minute. The peanut halves were then drained, rinsed to remove the skins, placed in trays and dried in a forced draft oven as described in Example 1, above. The temperature of the air was 255° F. (124° C.) and the drying time was 120 minutes. The relative humidity of the air which was used for drying was maintained at 25%. The flavor and odor characteristics of the peanut halves so processed were found to be substantially the same as the peanut granules processed in Example 1, above.

The above discussion and examples have been primarily directed toward the use of a multi-step batch process. While that type of operation has been found to be entirely adequate, no implication should be drawn that the practice of the present invention is limited to that particular system. The construction of a number of systems, both batch and continuous, which may be equal to or better than that which is described herein, is within the capacity of one skilled in the art.

What is claimed is:

1. A process for preparing a peanut product which is substantially free of the characteristic flavor and odor of roasted peanuts which comprises removing substantially all of the flavor precursors from raw peanut kernels by extracting the raw peanut kernels at a temperature of from about 100° F. to about 160° F. with an amount of water sufficient to give a water to peanut weight ratio of at least 2:1, and drying the peanut kernels so extracted for from about 30 minutes to about 150 minutes at a temperature of from about 200° F. to about 325° F. to a final moisture content of less than about 4% by weight.

2. A process for removing the flavor precursors from raw peanut kernels which comprises extracting the raw peanut kernels at a temperature of from about 125° F. to about 160° F. for from about 15 minutes to about 120 minutes with an amount of water sufficient to give a water to peanut weight ratio of from about 3:1 to about 10:1, and drying the peanut kernels so extracted for from about 60 minutes to about 120 minutes at a temperature of from about 250° F. to about 300° F. to a final moisture content of less than 4% by weight.

3. The process of claim 2 wherein the raw peanut kernels are in a form selected from the group consisting of whole kernels, half kernels, and granules of peanut kernels.

4. The process of claim 2 wherein the raw blanched peanut kernels are extracted for from about 30 minutes to about 45 minutes.

5. The process of claim 2 wherein the water temperature is from about 140° F. to about 150° F.

6. The process of claim 2 wherein the peanut kernels are dried in an atmosphere having a relative humidity of from about 10% to about 50%.

References Cited

UNITED STATES PATENTS

| | | | |
|---|---|---|---|
| 1,936,281 | 11/1933 | Winkler et al. | 99—98 |
| 2,026,676 | 1/1936 | Gill. | |
| 2,653,875 | 9/1953 | Wergeland | 99—126 |
| 2,809,114 | 10/1957 | Swarthout et al. | 99—126 |
| 2,835,585 | 5/1958 | Rusoff. | |

A. LOUIS MONACELL, *Primary Examiner*.

S. E. HEYMAN, *Assistant Examiner*.